US012036980B2

(12) United States Patent
Tsushima et al.

(10) Patent No.: US 12,036,980 B2
(45) Date of Patent: Jul. 16, 2024

(54) COURSE PREDICTION DEVICE, COMPUTER READABLE MEDIUM, AND COURSE PREDICTION METHOD

(71) Applicant: Mitsubishi Electric Corporation, Tokyo (JP)

(72) Inventors: Naoyuki Tsushima, Tokyo (JP); Yoshie Imai, Tokyo (JP); Shu Murayama, Tokyo (JP); Masahiro Abukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 701 days.

(21) Appl. No.: 17/263,230

(22) PCT Filed: Aug. 22, 2018

(86) PCT No.: PCT/JP2018/030977
§ 371 (c)(1),
(2) Date: Jan. 26, 2021

(87) PCT Pub. No.: WO2020/039517
PCT Pub. Date: Feb. 27, 2020

(65) Prior Publication Data
US 2021/0197811 A1     Jul. 1, 2021

(51) Int. Cl.
*B60W 30/095* (2012.01)
*G06V 20/58* (2022.01)
*G08G 1/16* (2006.01)

(52) U.S. Cl.
CPC ......... *B60W 30/0956* (2013.01); *G06V 20/58* (2022.01); *G08G 1/167* (2013.01);
(Continued)

(58) Field of Classification Search
CPC ............................ G08G 1/166; G08G 1/167
See application file for complete search history.

(56) References Cited

U.S. PATENT DOCUMENTS 10,671,076 B1 *  6/2020  Kobilarov .............. G08G 1/166
2012/0059789 A1 *  3/2012  Sakai ..................... G08G 1/161
                                                                         706/52
(Continued)

FOREIGN PATENT DOCUMENTS

JP       2006-227811 A       8/2006
JP       2011-123551 A       6/2011
(Continued)

OTHER PUBLICATIONS

Notice of Reasons for Refusal dated Feb. 19, 2021 from the Japanese Patent Office in JP Application No. 2020-537935.
(Continued)

*Primary Examiner* — Anshul Sood
(74) *Attorney, Agent, or Firm* — Sughrue Mion, PLLC; Richard C. Turner

(57) ABSTRACT

A course prediction device (1) includes a blind spot calculation unit (11) and a prediction unit (12). The blind spot calculation unit (11) acquires a sensing result sequentially from a sensor which is arranged in a mobile object and which detects whether an object exists, and calculates, based on sensor information, a blind spot area expressing such an area that an object existing therein cannot be detected by the sensor. The blind spot calculation unit (11) also detects an object entering the blind spot area based on the sensor information. The prediction unit (12) predicts a course in the blind spot area of the detected object based on the sensing result.

8 Claims, 20 Drawing Sheets

(52) U.S. Cl.
CPC ..... *B60W 2540/18* (2013.01); *B60W 2554/00* (2020.02); *B60W 2556/40* (2020.02)

(56) References Cited

U.S. PATENT DOCUMENTS

| | | | |
|---|---|---|---|
| 2017/0101092 A1 | 4/2017 | Nguyen Van et al. | |
| 2017/0116862 A1* | 4/2017 | Inoue | G08G 1/161 |
| 2018/0057003 A1* | 3/2018 | Hyun | B60W 40/06 |
| 2019/0001971 A1 | 1/2019 | Nguyen Van et al. | |
| 2019/0049972 A1* | 2/2019 | Prasad | G05D 1/0257 |
| 2019/0384302 A1* | 12/2019 | Silva | G06T 7/10 |
| 2020/0282982 A1 | 9/2020 | Nguyen Van et al. | |
| 2020/0331470 A1* | 10/2020 | Nanri | G08G 1/167 |

FOREIGN PATENT DOCUMENTS

| | | |
|---|---|---|
| JP | 2012-053533 A | 3/2012 |
| JP | 2015-225615 A | 12/2015 |
| JP | 2018-028743 A | 2/2018 |

OTHER PUBLICATIONS

International Search Report for PCT/JP2018/030977 dated Oct. 9, 2018 [PCT/ISA/210].

Office Action issued Mar. 4, 2022 in Chinese Application No. 201880096407.5.

* cited by examiner

Fig. 7

| IDENTIFICATION NUMBER | POSITION | VELOCITY INFORMATION |
|---|---|---|
| 001 | P1 | V1 |
| 002 | P2 | V2 |
| 003 | P3 | V3 |

COURSE PREDICTION DEVICE, COMPUTER READABLE MEDIUM, AND COURSE PREDICTION METHOD

CROSS REFERENCE TO RELATED APPLICATIONS

This application is a National Stage of International Application No. PCT/JP2018/030977 filed Aug. 22, 2018.

TECHNICAL FIELD

The present invention relates to a course prediction device, a course prediction program, and a course prediction method which predict a course of an object in a blind spot area.

BACKGROUND ART

Due to heightened safety awareness and the pursuit of convenience, an increasing number of automobiles are mounted with a driving support function such as an automatic emergency braking function, a function of keeping a distance between vehicles constant, and a function of automatically changing lanes. In order to realize the driving support function, a sensor such as an optical camera, a millimeter-wave radar, and Light Detection And Ranging (LiDAR) is sometimes used. The sensor for realizing such a driving support function cannot see through an object. Accordingly, when a plurality of objects are lined up in a depth direction, an object existing in an area that is behind a most foreground object cannot be detected. Hence, a blind spot area is formed for the sensor by a closest object.

With the driving support function that decides behavior of its own using a movement prediction result which predicts a future position of an object, when the object enters the blind spot area, movement prediction of the object cannot be continued. For this reason, there is a possibility that the above-mentioned driving support function stops movement prediction itself, and behaves erroneously assuming that there is no object even though an object actually exists.

Patent Literature 1 describes a method which, even when an object moves into a blind spot area, estimates a position of the object within the blind spot area using a velocity of the object with which the mobile object has entered the blind spot.

However, with the technique described in Patent Literature 1, since the position of the mobile object entering the blind spot area is estimated linearly, an accuracy of the estimated position becomes low in an environment having a complicated road shape.

Further, in Patent Literature 1, the blind spot area of the sensor is only statically obtained from the specifications of the sensor. When a plurality of objects are lined up in a depth direction, no consideration is given to detection of an object existing in an area that is behind the most foreground object.

CITATION LIST

Patent Literature

Patent Literature 1: JP 2015-225615 A

SUMMARY OF INVENTION

Technical Problem

An objective of the present invention is to provide a course prediction device that calculates a blind spot area formed in a sensing range of a sensor so as to acquire the blind spot area dynamically, and predicts a course in the blind spot area of an object entering the dynamically obtained blind spot area.

Solution to Problem

A course prediction device of the present invention includes:

a blind spot calculation unit to acquire sensor information being a detection result sequentially from a sensor which is arranged in a mobile object and which detects whether an object exists, to calculate, based on the sensor information, a blind spot area expressing such an area that the object existing therein cannot be detected by the sensor, and to detect the object entering the blind spot area based on the sensor information; and a prediction unit to predict a course in the blind spot area of the detected object based on the sensor information.

Advantageous Effects of invention

A course prediction device of the present invention is provided with a blind spot calculation unit and a prediction unit. Therefore, according to the present invention, a course prediction device can be provided that calculates a blind spot area formed in a sensing range of a sensor so as to acquire the blind spot area dynamically, and predicts a course in the blind spot area of an object entering the dynamically obtained blind spot area.

BRIEF DESCRIPTION OF DRAWINGS

FIG. 7 is a diagram of Embodiment 1 illustrating a sensing result 84.

FIG. 9 is a diagram of Embodiment 1 illustrating a second blind spot area 62a.

DESCRIPTION OF EMBODIMENTS

Figure 1:
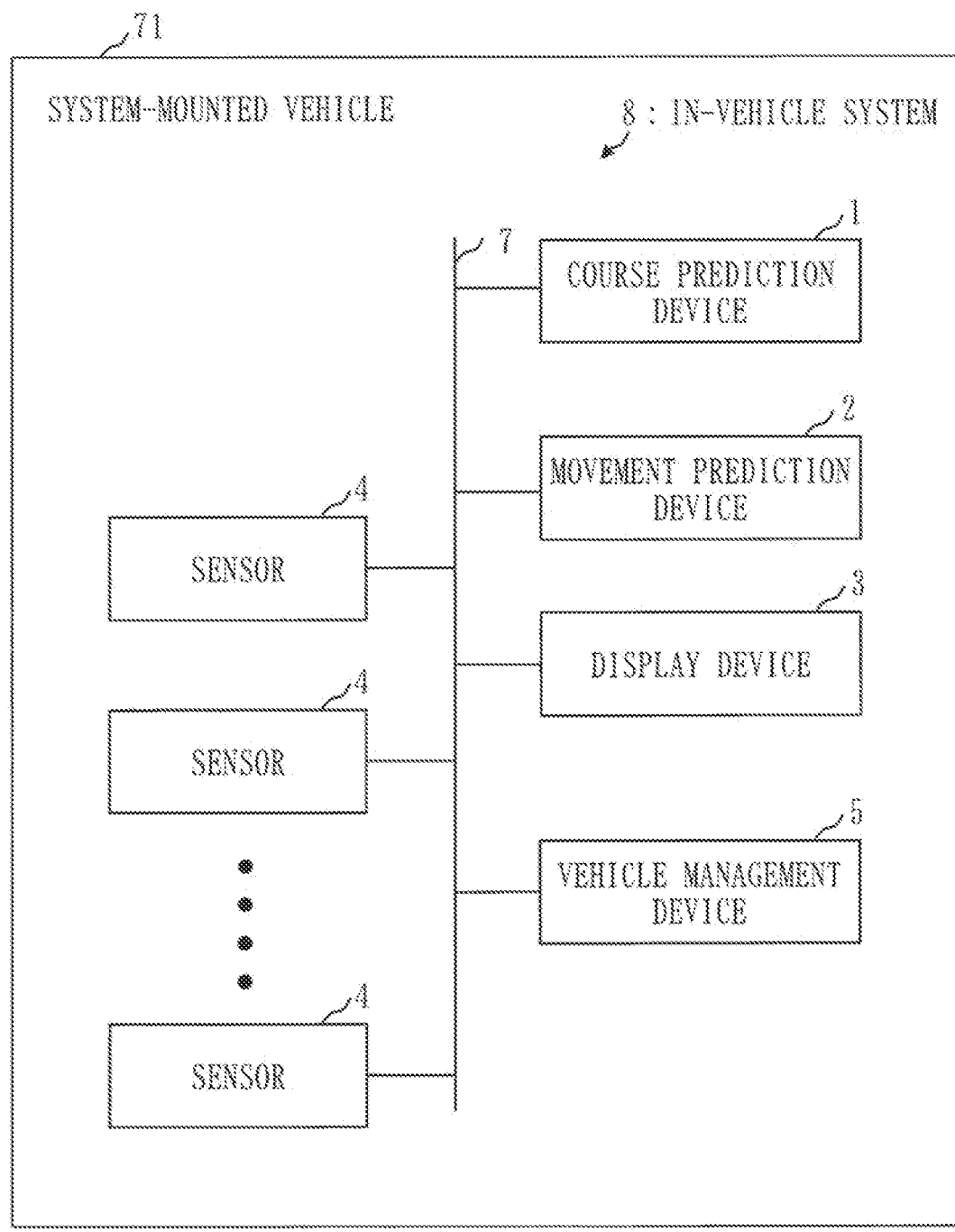
FIG. 1 is a diagram of Embodiment 1 illustrating an in-vehicle system 8.

Embodiments of the present invention will be described with referring to drawings. In the drawings, the same or equivalent portions are denoted by the same reference sign. In description of the embodiments, explanation on the same or equivalent portions will not be omitted or simplified as necessary.

Embodiment 1

Description of Configuration

A course prediction device 1 of Embodiment 1 will be described with referring to FIGS. 1 to 16.

FIG. 1 illustrates an in-vehicle system 8. A vehicle in which the in-vehicle system 8 is mounted is expressed as a system-mounted vehicle 71.

The in-vehicle system 8 is provided with the course prediction device 1, a movement prediction device 2, a display device 3, a plurality of sensors 4, and a vehicle management device 5, which are connected to each other via an in-vehicle network 7.

(1) The course prediction device 1 interpolates information of an obstacle that has entered a blind spot area and accordingly whose sensing result cannot be obtained.
(2) The movement prediction device 2 predicts movement of the obstacle based on a sensing result and interpolation which is performed by the course prediction device 1. The obstacle is, for example, another vehicle. Another vehicle is expressed as a vehicle 72 or a vehicle 73.
(3) The display device 3 transmits information to a person on board the system-mounted vehicle 71 using a display or the like.
(4) The sensor 4 is a sensor such as a millimeter-wave radar, LiDAR, and a camera for detecting an object outside the system-mounted vehicle 71. In the following, the sensor 4 is sometimes clarified by distinguishing between a sensor 4a and a sensor 4b. If clarification is not necessary, a sensor is expressed as a sensor 4.
(5) The vehicle management device 5 collects vehicle information of the system-mounted vehicle 71, such as a steering wheel angle, acceleration amount, velocity, and position of the system-mounted vehicle 71, and manages the vehicle information.
(6) The in-vehicle network 7 is a network such as a Controller Area Network (CAN) and in-vehicle Ethernet (registered trademark).

Figure 2:
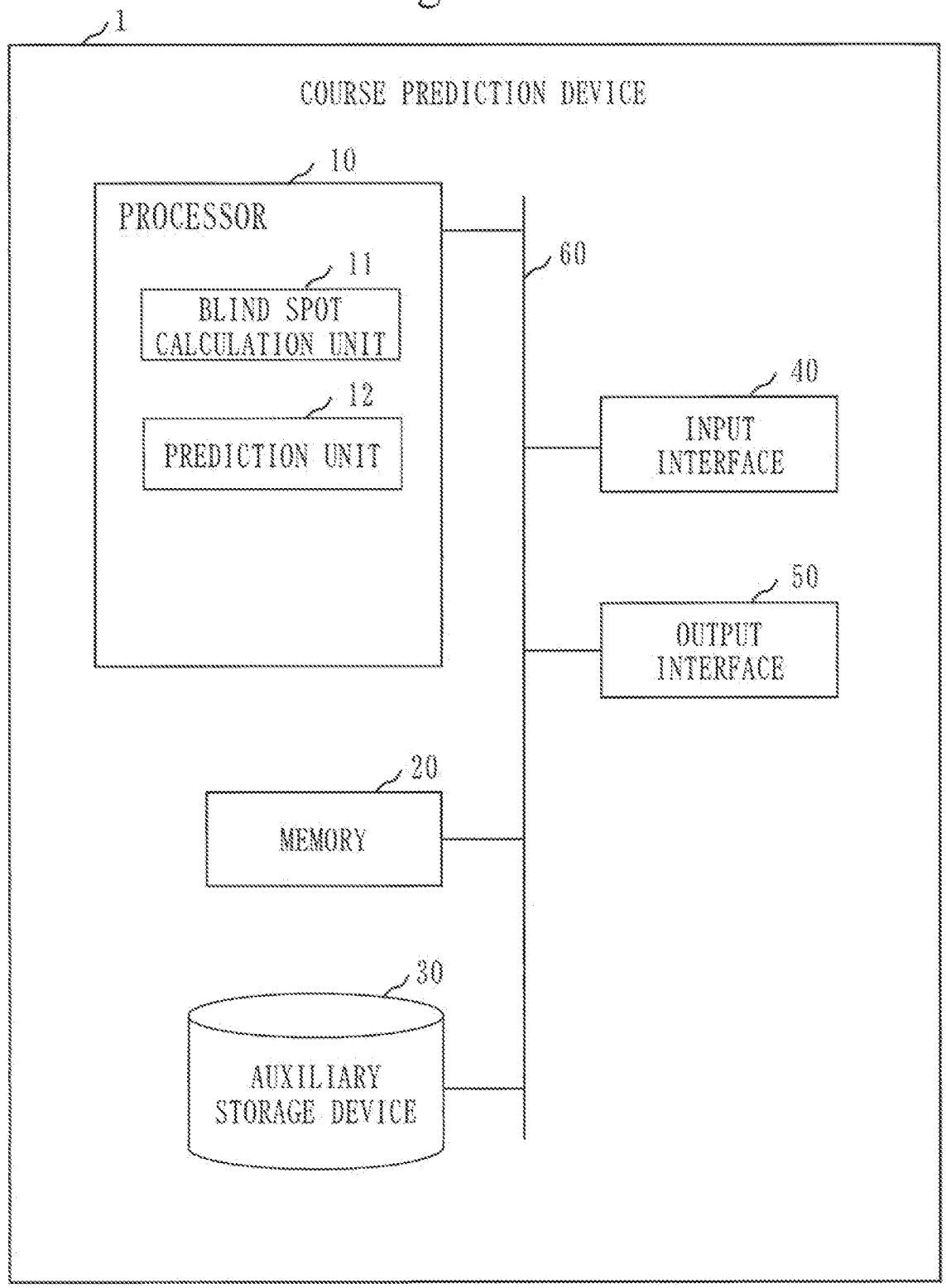
FIG. 2 is a diagram of Embodiment 1 illustrating a hardware configuration of a course prediction device 1.

FIG. 2 illustrates a hardware configuration of the course prediction device 1. The course prediction device 1 is a computer. The course prediction device 1 is provided with a processor 10 and other hardware devices such as a memory 20, an auxiliary storage device 30, an input interface 40, and an output interface 50. The processor 10 is connected to the other hardware devices via a signal line 60 and controls the other hardware devices.

The input interface 40 acquires information from the sensor 4. The processor 10 performs computation processing to interpolate the course of the obstacle. The interpolated obstacle course is sent from the output interface 50 to the movement prediction device 2 and the display device 3.

The course prediction device 1 is provided with a blind spot calculation unit 11 and a prediction unit 12, as function elements. Functions of the blind spot calculation unit 11 and prediction unit 12 are implemented by a course prediction program which is software.

The processor 10 is a device that executes the course prediction program. The course prediction program is a program that implements the functions of the blind spot calculation unit 11 and prediction unit 12. The processor 10 is an Integrated Circuit (IC) which performs processing of the blind spot calculation unit 11 and prediction unit 12. Specific examples of the processor 10 include a Central Processing Unit (CPU), a Digital Signal Processor (DSP), and a Graphics Processing Unit (GPU).

The memory 20 is a storage device that stores data temporarily. Specific examples of the memory 20 include a Static Random-Access Memory (SRAM) and a Dynamic Random-Access Memory (DRAM). The memory 20 holds a computation result of the processor 10.

The auxiliary storage device 30 is a storage device that stores data. Specific examples of the auxiliary storage device 30 include a Hard Disk Drive (HDD). The auxiliary storage device 30 may be a portable recording medium such as a Secure Digital (SD: registered trademark) memory card, a CompactFlash (CF), a NAND flash, a flexible disk, an optical disk, a compact disk, a blu-ray (registered trademark) disk, and a Digital Versatile Disk (DVD).

The input interface 40 acquires information from devices such as the sensor 4 and the vehicle management device 5. The output interface 50 outputs information to devices such as the movement prediction device 2 and the display device 3.

The course prediction program is read by the processor 10 from the memory 20 and executed by the processor 10. Not only the course prediction program but also an Operating System (OS) is stored in the memory 20. The processor 10 executes the course prediction program while executing the OS. The course prediction program and the OS may be stored in the auxiliary storage device 30. The course prediction program and the OS stored in the auxiliary storage device 30 are loaded in the memory 20 and executed by the processor 10. The course prediction program may be incorporated in the OS partially or entirely.

The course prediction device 1 may be provided with a plurality of processors that substitute for the processor 10. The plurality of processors share execution of the course prediction program. Each processor is a device that executes the course prediction program, as the processor 10 does.

Data, information, signal values, and variable values utilized, processed, or outputted by the course prediction program are stored in the memory 20, the auxiliary storage device 30, or a register or cache memory in the processor 10.

The course prediction program is a program that causes the computer to execute processes, procedures, or stages which are the blind spot calculation unit 11 and the prediction unit 12 with their "unit" being replaced by "process", "procedure", or "stage". A course prediction method is a method carried out by the course prediction device 1, being the computer, executing the course prediction program.

The course prediction program may be stored in a computer readable recording medium and provided in the form of the recording medium, or may be provided as a program product.

Figure 3:
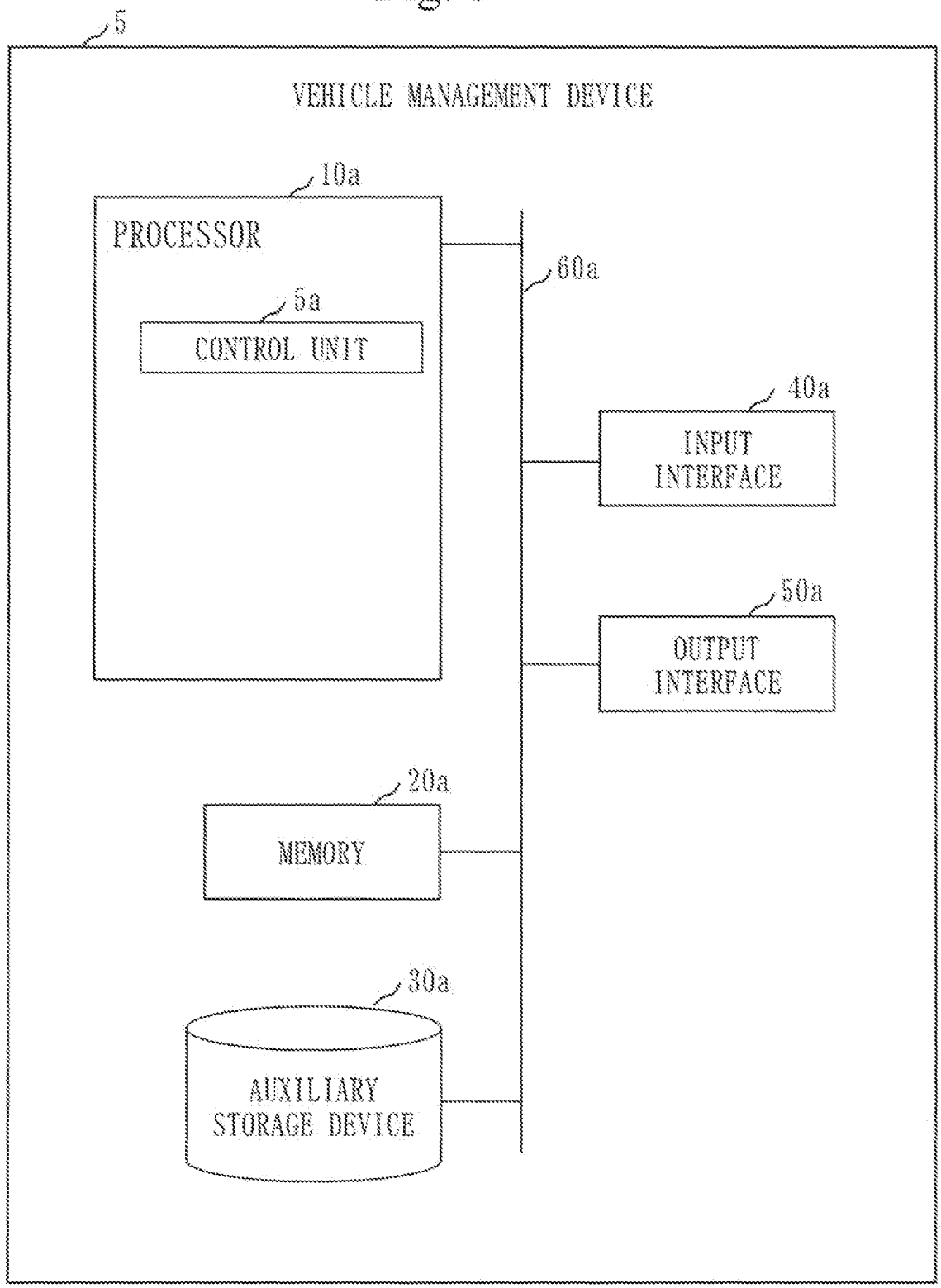
FIG. 3 is a diagram of Embodiment 1 illustrating a hardware configuration of a vehicle management device 5.

FIG. 3 illustrates a hardware configuration of the vehicle management device 5. The vehicle management device 5 is a computer similar to the course prediction device 1. The vehicle management device 5 is provided with a processor 10a, and other hardware devices such as a memory 20a, an auxiliary storage device 30a, an input interface 40a, and an output interface 50a. The processor 10a is connected to the other hardware devices via a signal line 60a, and controls the other hardware devices. The vehicle management device 5 is controlled by a control unit 5a. A function of the control unit 5a is implemented by a program. This program is stored in the auxiliary storage device 30a. The processor 10a loads this program to the memory 20a and executes the program.

Description of Operations

Operations of the course prediction device 1 will be described with referring to FIGS. 4 to 16. The operations of the course prediction device 1 correspond to the course prediction method. The operations of the course prediction device 1 also correspond to processing of the course prediction program.

Figure 4:
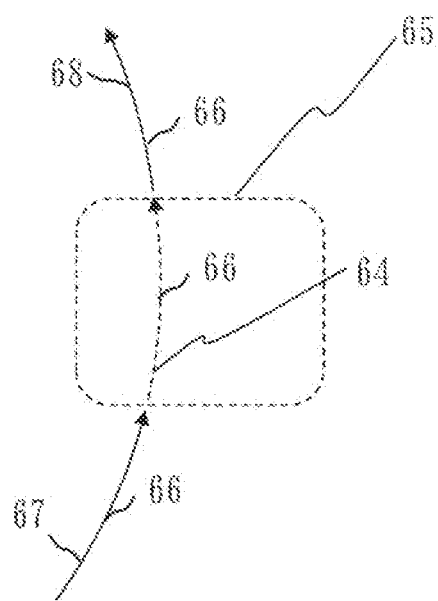
FIG. 4 is a diagram of Embodiment 1 illustrating course interpolation by the course prediction device 1.

FIG. 4 illustrates course interpolation performed by the course prediction device 1. When an obstacle 66 such as a vehicle passes through a blind spot area 65, the course prediction device 1 predicts a course of the obstacle 66 in the blind spot area 65 between a pre-passage course 67 and a post-passage course 68, as a predicted course 64, and interpolates the course between the pre-passage course 67 and the post-passage course 68.

Figure 5:
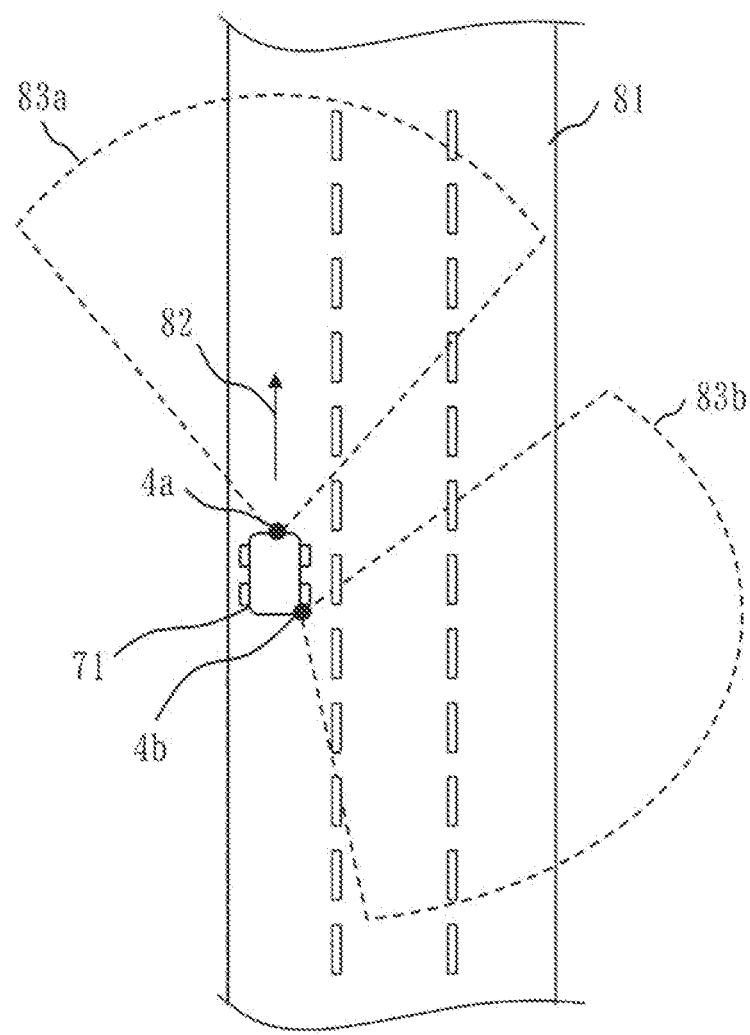
FIG. 5 is a diagram of Embodiment 1 illustrating a situation of a road 81.

FIG. 5 illustrates a road 81 assumed in Embodiment 1 and a peripheral situation of the road 81. The system-mounted vehicle 71 is traveling in an advancing direction 82. In the system-mounted vehicle 71, the sensor 4a is attached to the center of a front portion, and the sensor 4b is attached to the right side of a rear portion. Each of a sensing range 83a of the sensor 4a and a sensing range 83b of the sensor 4b corresponds to an inside of an individual fan shape indicated by a broken line. In the interest of simple explanation, two sensors are illustrated. However, the number of sensors is not limited to two. For example, a sensor may be attached to the left side of the rear portion of the system-mounted vehicle 71 to be symmetrical with the sensor 4b.

Figure 6:
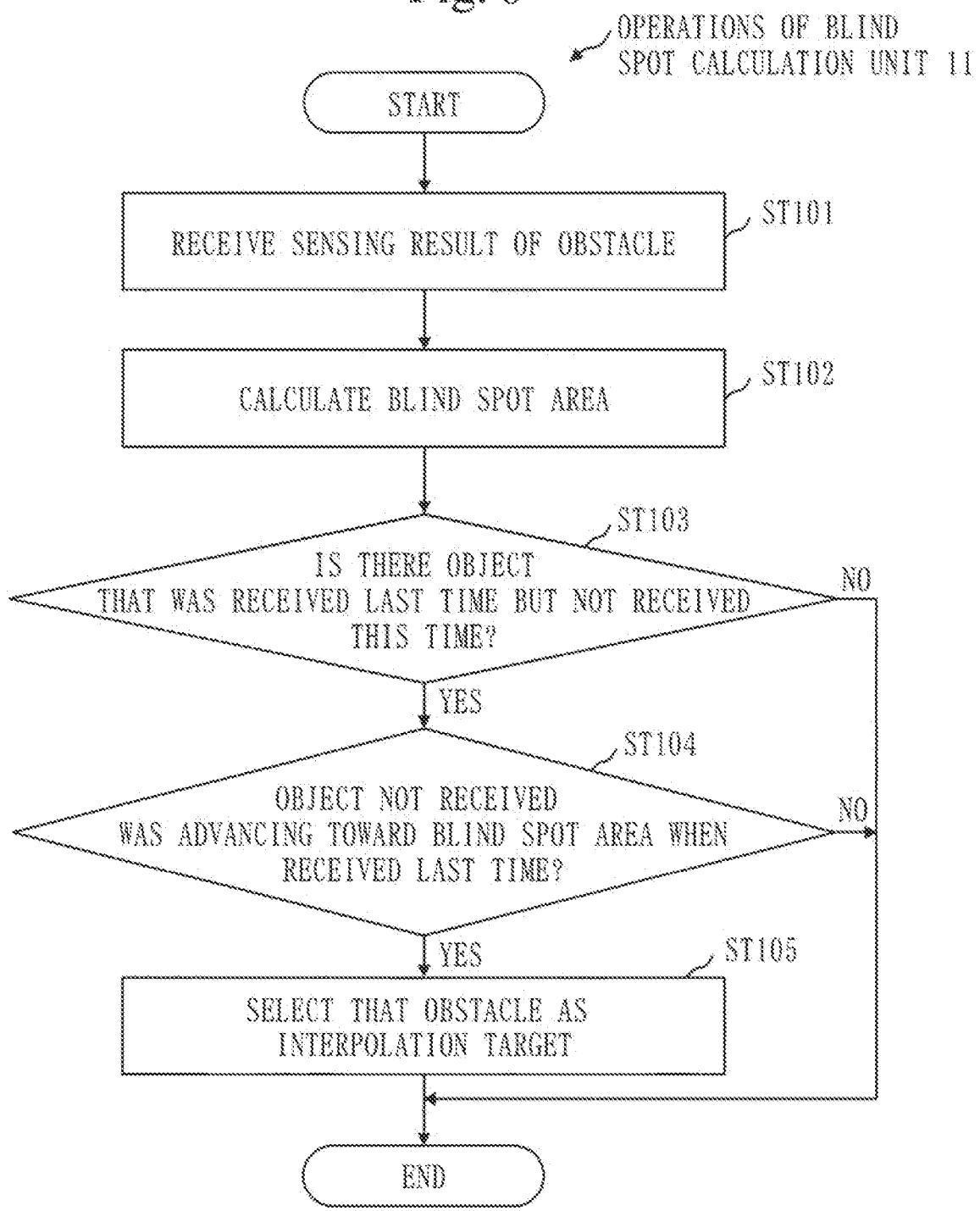
FIG. 6 is a diagram of Embodiment 1 which is a flowchart illustrating operations of a blind spot calculation unit 11.

FIG. 6 is a flowchart illustrating operations of the blind spot calculation unit 11. Referring to FIG. 6, an operation algorithm of the blind spot calculation unit 11 will be described with using a flowchart. The flowchart of FIG. 6 will be explained based on a status of the road 81 of FIG. 5.
<Step ST101>
In step ST101, the blind spot calculation unit 11 receives an obstacle sensing result acquired by the sensors 4a and 4b.

FIG. 7 indicates a sensing result 84. As illustrated in FIG. 7, the sensing result 84 basically includes a position of the obstacle and an identification number which is continuously imparted to the same obstacle by the sensor. Information in each row of FIG. 7 is sent from the sensor as the sensing result 84. Depending on the sensor, the sensing result 84 also includes velocity information of the obstacle. FIG. 7 indicates three sensing results.
<Step ST102>
In step ST102, a blind spot area of the sensor is calculated. There are two types of blind spot areas, as described below, which will be referred to as a first blind spot area 61 and a second blind spot area 62. The first blind spot area 61 results from the sensing range of each sensor and a position of each sensor attached to the system-mounted vehicle 71. The second blind spot area 62 is formed in an area located behind an obstacle existing in a sensing area of each sensor. The blind spot calculation unit 11 can calculate the first blind spot area 61 from specifications of the sensor 4 and a setting position of the sensor 4 in the system-mounted vehicle 71. The blind spot calculation unit 11 can calculate the second blind spot area 62 using the sensing result 84.

Figure 8:
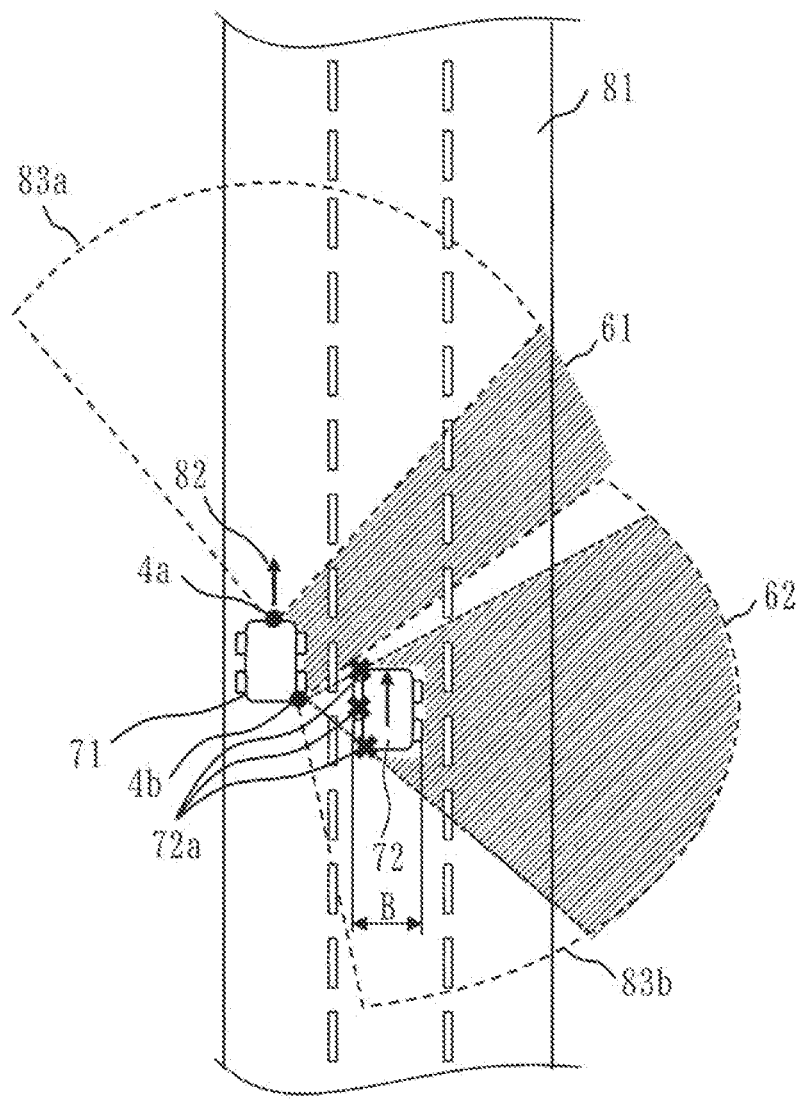
FIG. 8 is a diagram of Embodiment 1 illustrating a first blind spot area 61 and a second blind spot area 62.

FIG. 8 illustrates the first blind spot area 61 and the second blind spot area 62. The first blind spot area 61 is an area included in neither the sensing range of the sensor 4a nor the sensing range of the sensor 4b.

The second blind spot area 62 is a sensing range located behind the vehicle 72 when the vehicle 72 exists in the sensing range of the sensor 4b. In order to obtain the second blind spot area 62 of the sensor 4b, it is necessary to estimate the outer shape of the vehicle 72. If the sensor 4b is a radio-wave emitting sensor or a light-beam emitting sensor, the outer shape of the vehicle 72 can be estimated with using radio-wave or light-beam reflection points 72a at two ends. If the size of a car width B of the vehicle 72 is unknown, the blind spot calculation unit 11 supposes that the size of the car width B to be a car width B of a general vehicle, as in FIG. 8. Information used by the blind spot calculation unit 11, such as the general car width B, is stored in the auxiliary storage device 30. Likewise, information used by the prediction unit 12 is also stored in the auxiliary storage device 30.

Figure 9:
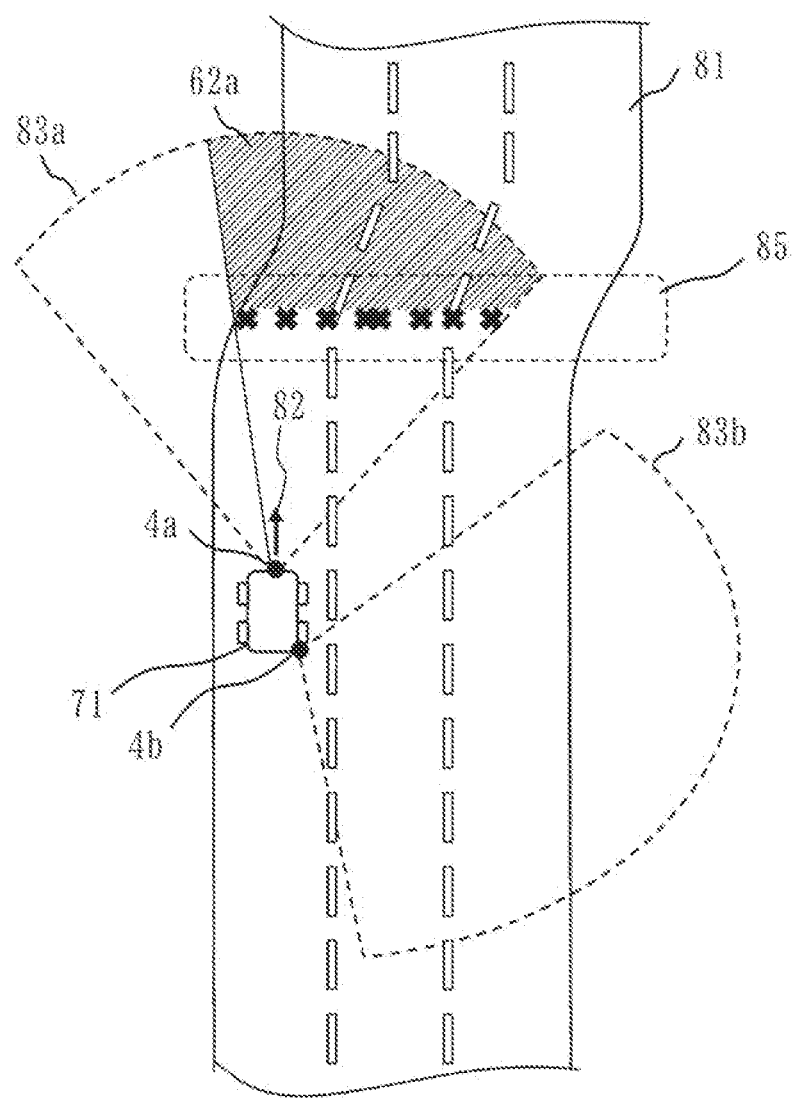

FIG. 9 illustrates a second blind spot area 62a.

Figure 10:
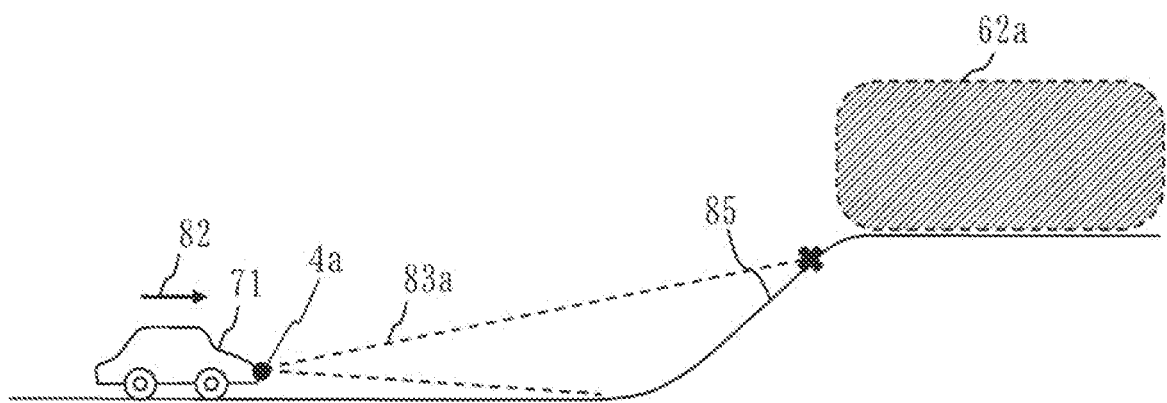
FIG. 10 is a diagram of Embodiment 1 presenting FIG. 9 seen from a left side in an advancing direction 82 of a system-mounted vehicle 71.

FIG. 10 is a diagram presenting FIG. 9 seen from a left side in the advancing direction 82 of the system-mounted vehicle 71. As illustrated in FIGS. 9 and 10, when there is a slope 85 in the sensing range 83a of the sensor 4a, the range that the sensor 4a can sense is only as far as to the inclined surface of the slope 85. As a result, an inner area of the slope 85 forms the second blind spot area 62a.

As described above, the blind spot calculation unit 11 acquires, as sensor information being a detection result, the sensing result 84 sequentially from the sensor 4 which is arranged in the system-mounted vehicle 71 being a mobile object and which detects whether an object exists. The blind spot calculation unit 11 calculates, based on the sensing result 84 being the sensor information, a blind spot area expressing such an area that an object existing therein cannot be detected by the sensor.
<Step ST103>
In step ST103, the blind spot calculation unit 11 judges whether or not an obstacle sensed the last time by the sensor 4a or sensor 4b was unsensed this time. For this judgment, the blind spot calculation unit 11 stores identification numbers to be outputted from the sensor in advance and uses them. Specifically, the blind spot calculation unit 11 receives the sensing result 84 of each row of FIG. 7 from the sensor 4 via the input interface 40. As the individual sensing results 84 include identification numbers, the blind spot calculation unit 11 stores the identification numbers in advance and uses them. Assume that the sensing result 84 received the last time is composed of a sensing result including identification number 002 and a sensing result including identification number 003, and that the sensing result 84 received this time is composed of only a sensing result including identification number 002. In this case, an obstacle with identification number 003 is an obstacle with identification number 003 is an obstacle that was sensed the last time and was unsensed this time.

<Step ST104>

In step ST104, the blind spot calculation unit 11 judges whether or not the obstacle unsensed this time was moving toward the blind spot area in the sensing result 84 received the last time. Specifically, in the above example, the obstacle unsensed this time is an obstacle with identification number 003. The blind spot calculation unit 11 can judge whether the obstacle with identification number 003 was moving toward the blind spot area, by referring to the velocity information of the sensing result 84 with identification number 003, which was received the last time.

In this manner, the blind spot calculation unit 11 detects an object entering the blind spot area based on the sensing result 84 being the sensor information.

<Step ST105>

If the blind spot calculation unit 11 judges in step ST104 that the obstacle with identification number 003 was advancing toward the blind spot area (YES in step ST104), then in step ST105, the blind spot calculation unit 11 selects the obstacle with identification number 003 as an interpolation target. This is due to the following reason. If the obstacle with identification number 003 was advancing toward the blind spot area, it is possible to assume that the entry of the obstacle with identification number 003 to the blind spot area is the reason why the sensing result 84 of identification number 003 was not received this time.

Figure 11:
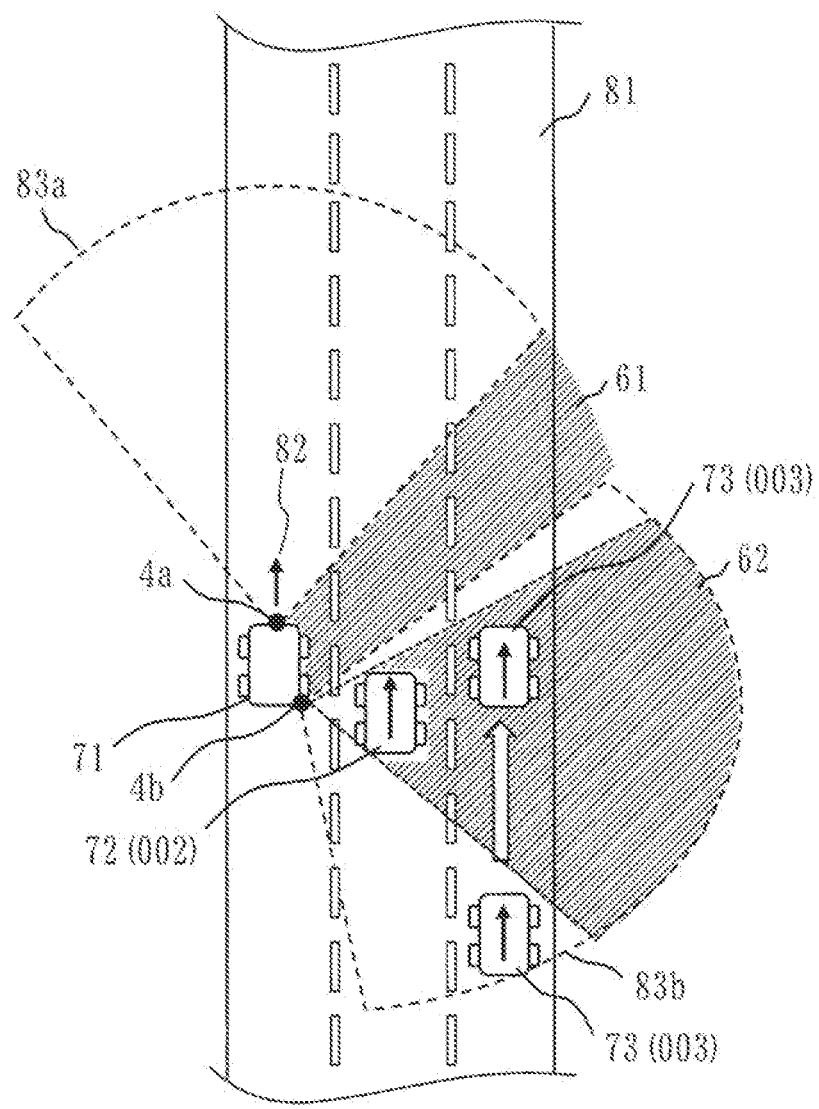
FIG. 11 is a diagram of Embodiment 1 illustrating a case where an obstacle with identification number 003 has entered a blind spot area.

FIG. 11 illustrates a case where the obstacle with identification number 003 has entered the blind spot area. In FIG. 11, the vehicle 73 has been added to FIG. 8. In FIG. 11, the vehicle 72 corresponds to the obstacle with identification number 002, and the vehicle 73 corresponds to the obstacle with identification number 003. The vehicle 73 has entered the second blind spot area 62. As the vehicle 73 enters the second blind spot area 62 formed by the vehicle 72, in step ST105, the blind spot calculation unit 11 selects the vehicle 73 as an interpolation target.

Figure 12:
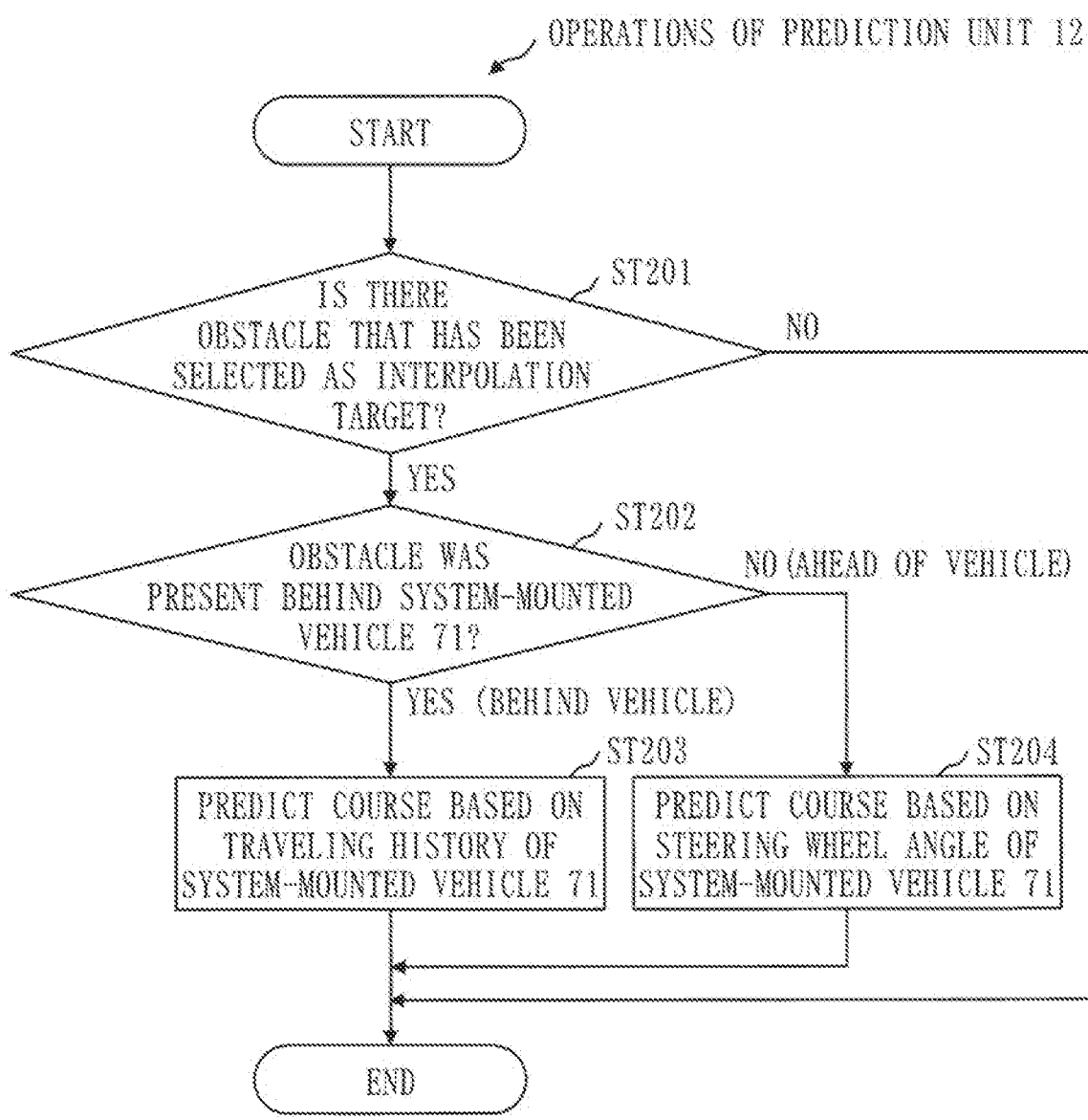
FIG. 12 is a diagram of Embodiment 1 which is a flowchart illustrating operations of a prediction unit 12.

FIG. 12 is a flowchart illustrating operations of the prediction unit 12. Referring to FIG. 12, an operation algorithm of the prediction unit 12 will be explained by the flowchart.

<Step ST201>

In step ST201, the prediction unit 12 judges whether or not there is an obstacle that has been selected by the blind spot calculation unit 11 as an interpolation target.

<step ST202>

If a selected obstacle exists, then in step ST202, the prediction unit 12 judges whether that obstacle was located behind the system-mounted vehicle 71 or ahead of the system-mounted vehicle 71.

The prediction unit 12 predicts a course in the blind spot area of the detected object based on the sensing result 84 which is sensor information. To predict based on the sensing result 84 means that the prediction unit 12 decides whether a position of another vehicle which is the detected object is ahead of the system-mounted vehicle 71 or behind the system-mounted vehicle 71 using the sensing result 84, and predicts a course of another vehicle from a decision result.

Whether being ahead of the system-mounted vehicle 71 or behind the system-mounted vehicle 71 can be judged from the position of an object included in the sensing result 84, that is, of another vehicle, and from the position of the system-mounted vehicle 71. The position of the system-mounted vehicle 71 is held in the auxiliary storage device 30a by the vehicle management device 5. The prediction unit 12 can judge whether being ahead of the system-mounted vehicle 71 or behind the system-mounted vehicle 71 from the sensing result 84 acquired from the sensor and from the position of the system-mounted vehicle 71 acquired from the vehicle management device 5.

<Step ST203>

If the obstacle is located behind the system-mounted vehicle 71, then in step ST203, the prediction unit 12 interpolates the data of the vehicle 73 based on a traveling trace which is a traveling history of the system-mounted vehicle 71. Taking FIG. 11 as an example, the prediction unit 12 predicts the course of the vehicle 73 in the second blind spot area 62 using the traveling trace which is the traveling history of the system-mounted vehicle 71. The traveling trace of the system-mounted vehicle 71 is collected and managed by the control unit 5a of the vehicle management device 5. The traveling trace of the system-mounted vehicle 71 is stored in the auxiliary storage device 30a.

Figure 13:
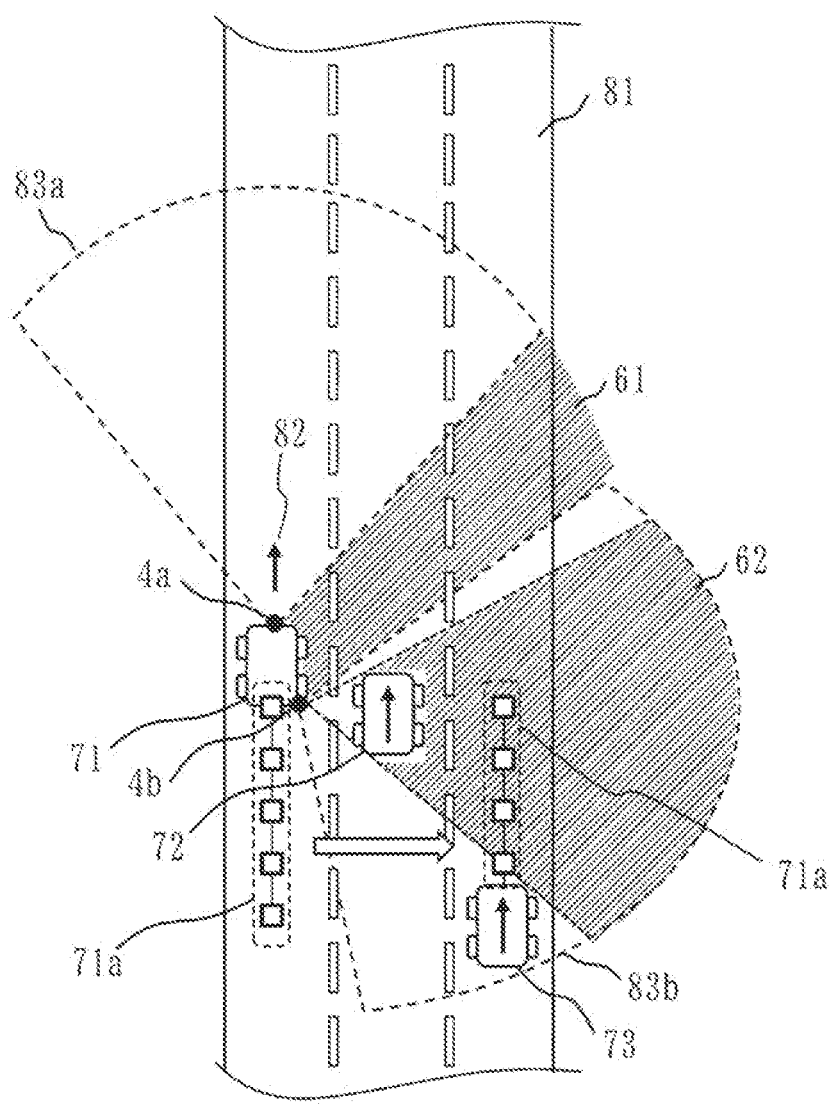
FIG. 13 is a diagram of Embodiment 1 describing course prediction of a vehicle 73 in a case where the vehicle 73 is located behind the system-mounted vehicle 71.

FIG. 13 is a diagram describing course prediction of the vehicle 73 in a case where the vehicle 73, being an obstacle, is located behind the system-mounted vehicle 71. As illustrated in FIG. 13, the prediction unit 12 shifts a traveling trace 71a so far of the system-mounted vehicle 71 to the position of the vehicle 73 in a horizontal direction. The position of the vehicle 73 is a position of immediately before the vehicle 73 enters the second blind spot area 62. The position of immediately before is, in a case where there is a sensing result 84 received the last time in step ST103 but not received this time, a position included in the sensing result 84 received the last time. The prediction unit 12 predicts the shifted traveling trace 71a as the course of the vehicle 73 in the second blind spot area 62.

The prediction unit 12 acquires the traveling trace 71a from the auxiliary storage device 30a. The traveling trace 71a is shape decisive information expressing information that can decide a shape of a moving course of the system-mounted vehicle 71 which is a mobile object.

In this case, the traveling trace 71a is the shape itself of the moving course of the system-mounted vehicle 71. The prediction unit 12 acquires from the vehicle management device 5 the shape decisive information expressing the information that can decide the shape of the moving course of the system-mounted vehicle 71 which is a mobile object and, using the shape decisive information, predicts the course in the blind spot area of the object whose entry to the blind point area has been detected.

<Step ST204>

If the obstacle is located ahead of the system-mounted vehicle 71, the prediction unit 12 predicts the course of the obstacle as follows.

That is, in a case where there is a sensing result 84 received the last time in step ST103 but not received this time, a position included in the sensing result 84 received the last time was located ahead of the position of the system-mounted vehicle 71 at the time the sensing result 84 was received.

Figure 14:
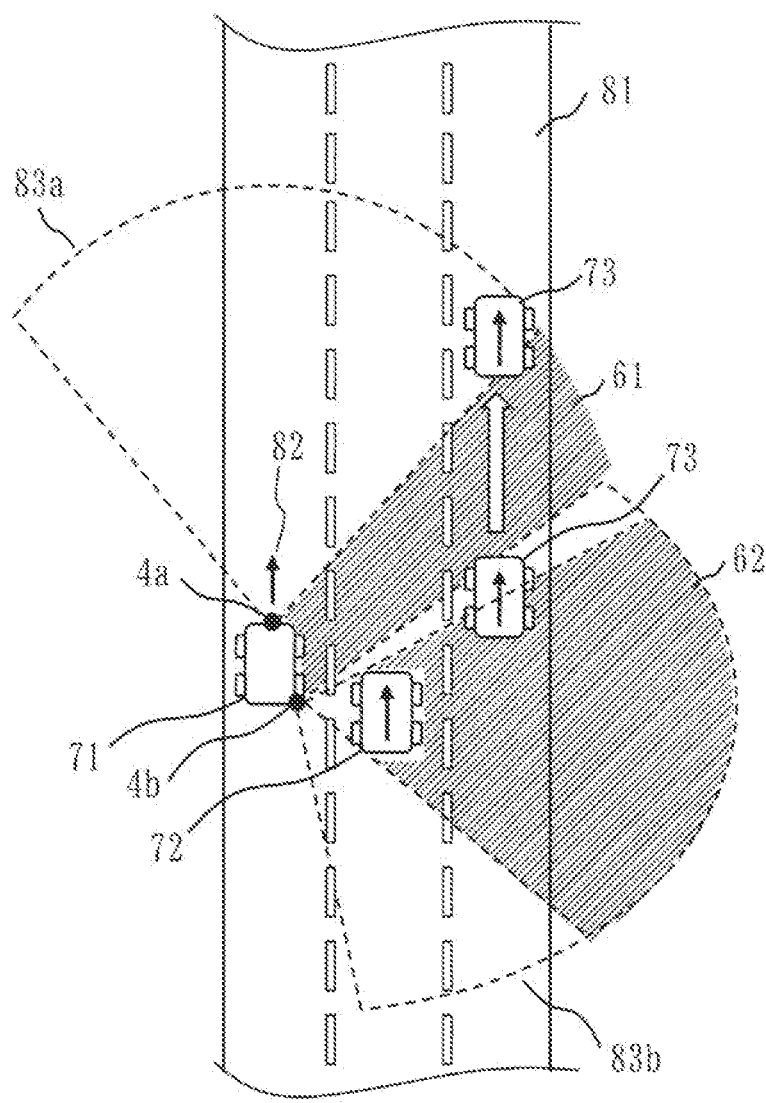
FIG. 14 is a diagram of Embodiment 1 illustrating course prediction of an obstacle in a case where a vehicle 73 is located ahead of the system-mounted vehicle 71.

FIG. 14 illustrates course prediction of an obstacle in a case where the obstacle is located ahead of the system-mounted vehicle 71. In FIG. 14, the vehicle 73 is the obstacle. When the obstacle is located ahead of the system-mounted vehicle 71 as illustrated in FIG. 14, the prediction unit 12 interpolates the data based on the steering wheel angle of the system-mounted vehicle 71. That is, the prediction unit 12 predicts the course of the vehicle 73 in the first blind spot area 61 of the vehicle 73 based on the steering wheel angle of the system-mounted vehicle 71. The steering wheel angle of the system-mounted vehicle 71 is collected by the control unit 5a of the vehicle management device 5 and stored in the auxiliary storage device 30a. The prediction unit 12 acquires the steering wheel angle from the vehicle management device 5.

Figure 15:
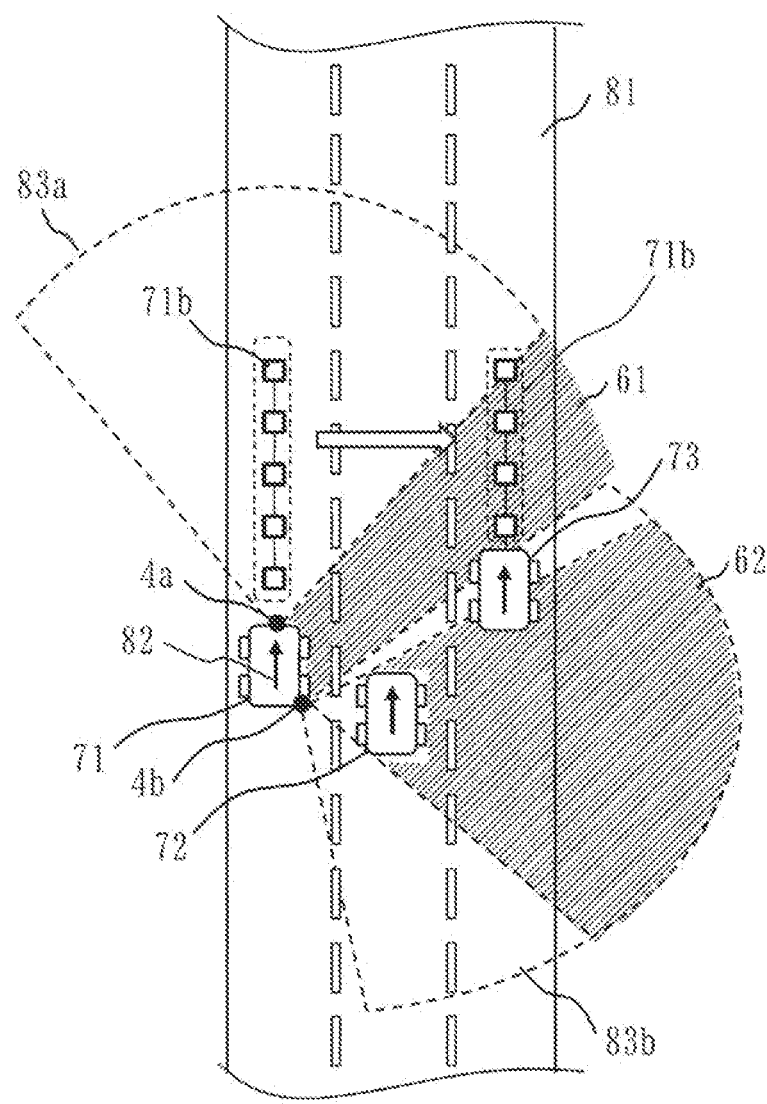
FIG. 15 is a diagram of Embodiment 1 illustrating a case where the system-mounted vehicle 71 has a steering wheel angle of zero degree.

FIG. 15 illustrates a case where the system-mounted vehicle 71 has a steering wheel angle of zero degree. Assume that the steering wheel angle of the system-mounted vehicle 71 in a straight-going state is zero degree, rotation of the steering wheel in the left direction is expressed as a positive direction, and rotation of the steering wheel in the right direction is expressed as a negative direction. As illustrated in FIG. 15, the prediction unit 12 obtains a predicted travel course 71b of the system-mounted vehicle 71 of from now on from the steering wheel angle of the system-mounted vehicle 71. The prediction unit 12 shifts the predicted travel course 71b of the system-mounted vehicle 71 to the position of the vehicle 73 of immediately before entry to the first blind spot area 61 in the horizontal direction. The shifted predicted travel course 71b of the system-mounted vehicle 71 is the predicted travel course of the vehicle 73 in the first blind spot area 61. The prediction unit 12 interpolates data assuming that the vehicle 73 will travel to follow the shifted predicted travel course 71b of the system-mounted vehicle 71. In FIG. 15, the road is straight and accordingly the steering wheel angle of the system-mounted vehicle 71 stays unchanged at the center with an angle of zero degree. Thus, the predicted travel course 71b of the system-mounted vehicle 71 is straight.

Figure 16:
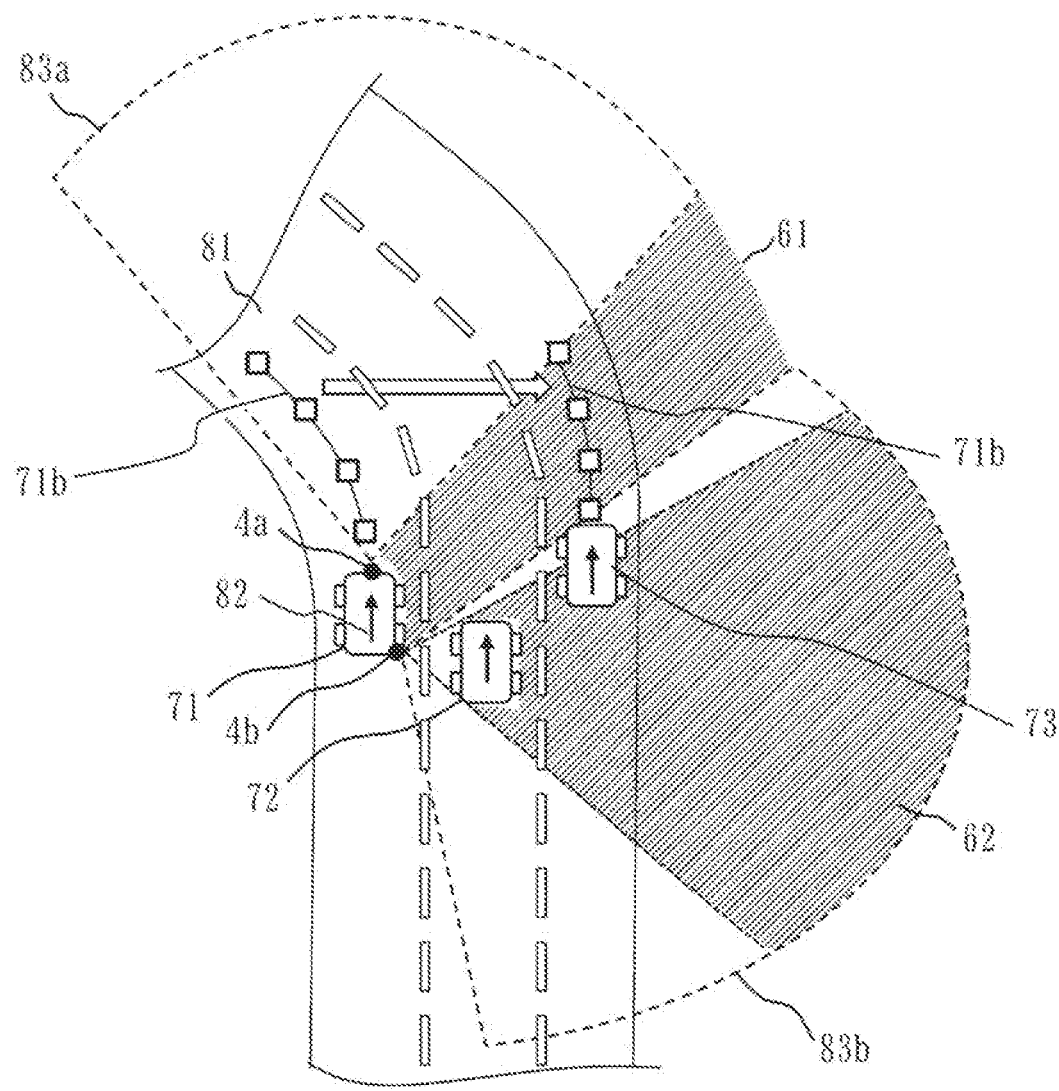
FIG. 16 is a diagram of Embodiment 1 illustrating a case where the system-mounted vehicle 71 has a steering wheel angle of a positive value.

FIG. 16 illustrates a case where the system-mounted vehicle 71 has a steering wheel angle of a positive value. FIG. 16 illustrates a case where the system-mounted vehicle 71 is traveling a road 81 having a left bend curve. In the case of FIG. 16, the system-mounted vehicle 71 is steered to follow the left bend curve. Hence, the predicted travel course 71b of the system-mounted vehicle 71 forms a course extending to follow the left bend curve, that is, to follow a predetermined turning radius. At this time, using the turning radius of the system-mounted vehicle 71 and the right-left distance between the system-mounted vehicle 71 and the vehicle 73, the turning radius of the vehicle 73 at this time is expressed by following Expression 1.

(turning radius of vehicle 73)=(turning radius of system-mounted vehicle 71) +(right-left direction between system-mounted vehicle 71 and vehicle 73)     (Expression 1)

The prediction unit 12 calculates the turning radius of the system-mounted vehicle 71 from the steering wheel angle of the system-mounted vehicle 71. The prediction unit 12 also calculates the right- left distance between the system-mounted vehicle 71 and the vehicle 73 from the sensing result 84 of the vehicle 73. The prediction unit 12 calculates the predicted travel course 71b of the vehicle 73 from the turning radius of the vehicle 73.

Information concerning the system-mounted vehicle 71 is held by the vehicle management device 5. Hence, the course prediction device 1 acquires the information concerning the system-mounted vehicle 71 from the vehicle management device 5.

The turning radius of the system-mounted vehicle 71 is generally expressed by the following Expression 2. A wheel base is a distance between an axle center of a front wheel and an axle center of a rear wheel.

(turning radius of system-mounted vehicle 71)= (wheel base)/sin θ     (Expression 2)

Note that θ is a steering wheel angle of the system-mounted vehicle 71, and that the steering wheel angle is a steering angle.

The prediction unit 12 acquires the steering wheel angle from the auxiliary storage device 30a. The steering wheel angle is shape decisive information that expresses information that can decide the shape of the moving course of the system-mounted vehicle 71 which is a mobile object.

In this case, the prediction unit 12 calculates the predicted travel course 71b, being the moving course of the system-mounted vehicle 71, from the steering wheel angle.

That is, the prediction unit 12 acquires from the vehicle management device 5 the steering wheel angle as the shape decisive information expressing information that can decide the shape of the moving course of the system-mounted vehicle 71 which is a mobile object, and predicts the course in the blind spot area of the object whose entry to the blind spot area has been detected, using the shape decisive information.

Note that the steering wheel angle is steering information on how the system-mounted vehicle 71, being a mobile object, is being steered.

The steering information may include a rudder angle of the front wheel, or a moving distance of a rack in a rack-and-pinion mechanism that forms a steering wheel mechanism, in addition to the steering wheel angle of the system-mounted vehicle 71.

When a velocity is to be used in interpolating data, a velocity and acceleration of immediately before the obstacle enters a blind spot area are used. As velocity information, information detected by the sensor itself is used. In a situation where the accuracy of the sensor deteriorates, a value obtained by differentiating a change in position of the obstacle is used as the velocity information, instead of the information detected by the sensor itself. Specifically, for example, a millimeter-wave radar uses the Doppler effect for detecting the velocity of the obstacle. With this scheme, an accurate velocity can be obtained when the obstacle approaches the sensor or moves away from the sensor, but the accuracy deteriorates when the obstacle moves while maintaining a constant distance from the sensor.

Data interpolation by the prediction unit 12 ends when the obstacle position as a result of interpolation gets out of the blind spot area. If, however, a velocity of the system-mounted vehicle 71 and a velocity of another vehicle which is the obstacle are very close, the obstacle stays in the blind spot area for a long time. In such a case, a cancel time may be reserved at which interpolation, that is, obstacle course prediction processing, is ended. Alternatively, the prediction unit 12 may inversely inform the display device 3 that an obstacle exists in the blind spot area based on the fact that an obstacle stays in the blind spot area, although its detail position is unknown.

Effect of Embodiment 1

In above Embodiment 1, an interpolation result of interpolating the course of an obstacle by a predicted obstacle traveling course obtained by the course prediction device 1 can be inputted to the movement prediction device 2. As the interpolation result can be inputted to the movement prediction device 2, a sensing result of the obstacle is interpolated in the movement prediction device 2, even when the obstacle enters the blind spot. Therefore, movement prediction of the obstacle can be performed continuously. Embodiment 1 describes a case of a vehicle. When Embodiment 1 is applied to a vessel or a train which travels to follow a track, the same effect as that obtained when the present embodiment is applied to a vehicle can be obtained.

Embodiment 2

Embodiment 2 will be described with referring to FIGS. 17 to 19. In Embodiment 1, in course prediction of a case where another vehicle exists in a blind spot area of a sensor arranged in the system-mounted vehicle 71, the course of another vehicle is predicted from the traveling trace or steering angle of the system-mounted vehicle 71. In Embodiment 2, map information is used for course prediction of a case where another vehicle exists in a blind spot area of a sensor arranged in the system-mounted vehicle 71.

Figure 17:
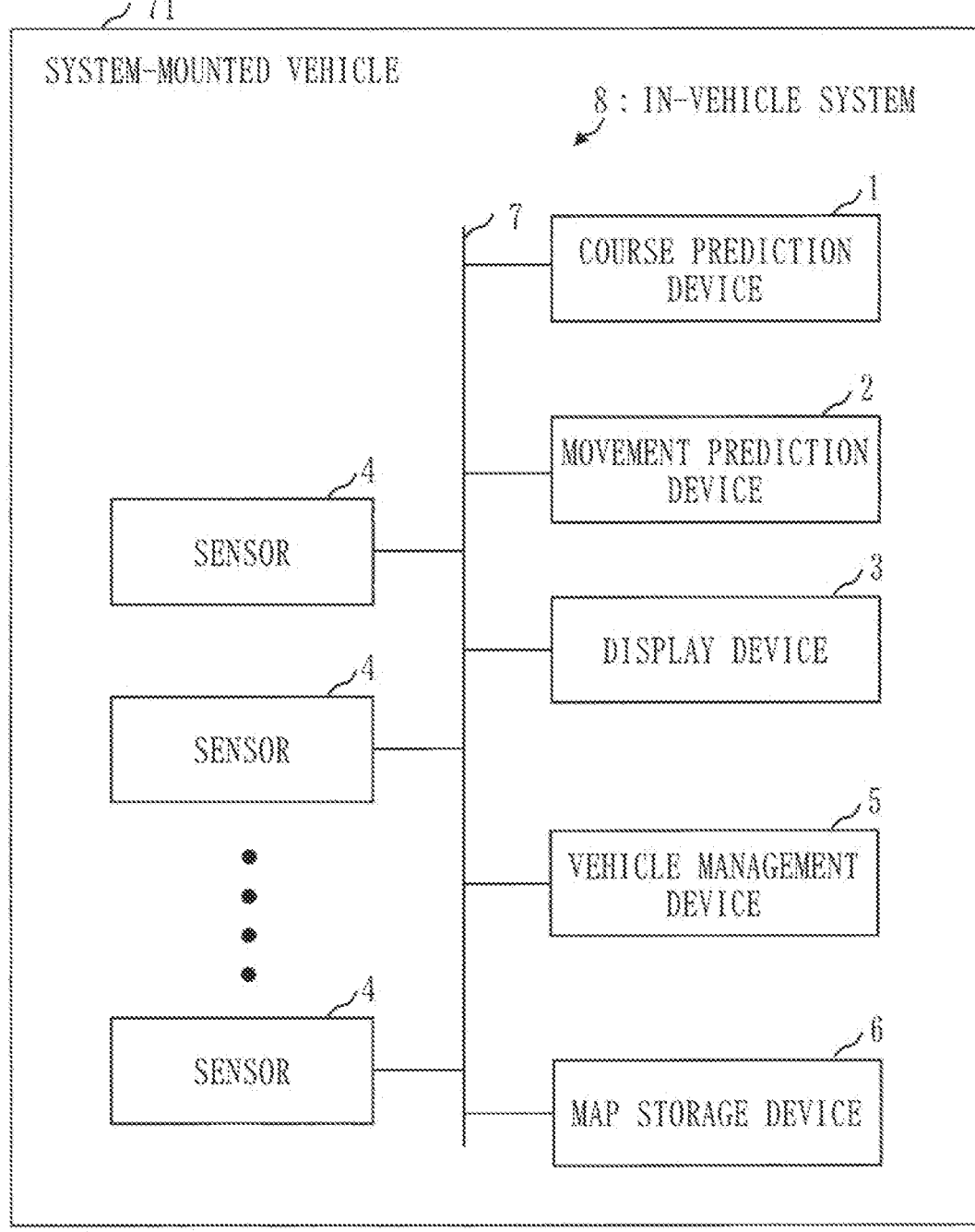
FIG. 17 is a diagram of Embodiment 2 illustrating an in-vehicle system 8.

FIG. 17 illustrates an in-vehicle system 8 of Embodiment 2. A case will be described where a map storage device 6 is added to the hardware configuration as illustrated in FIG. 17.

Information about a road lane shape is stored in the map storage device 6 as map information. Specifically, position information of a point expressing a lane center is stored for points at predetermined intervals.

Figure 18:
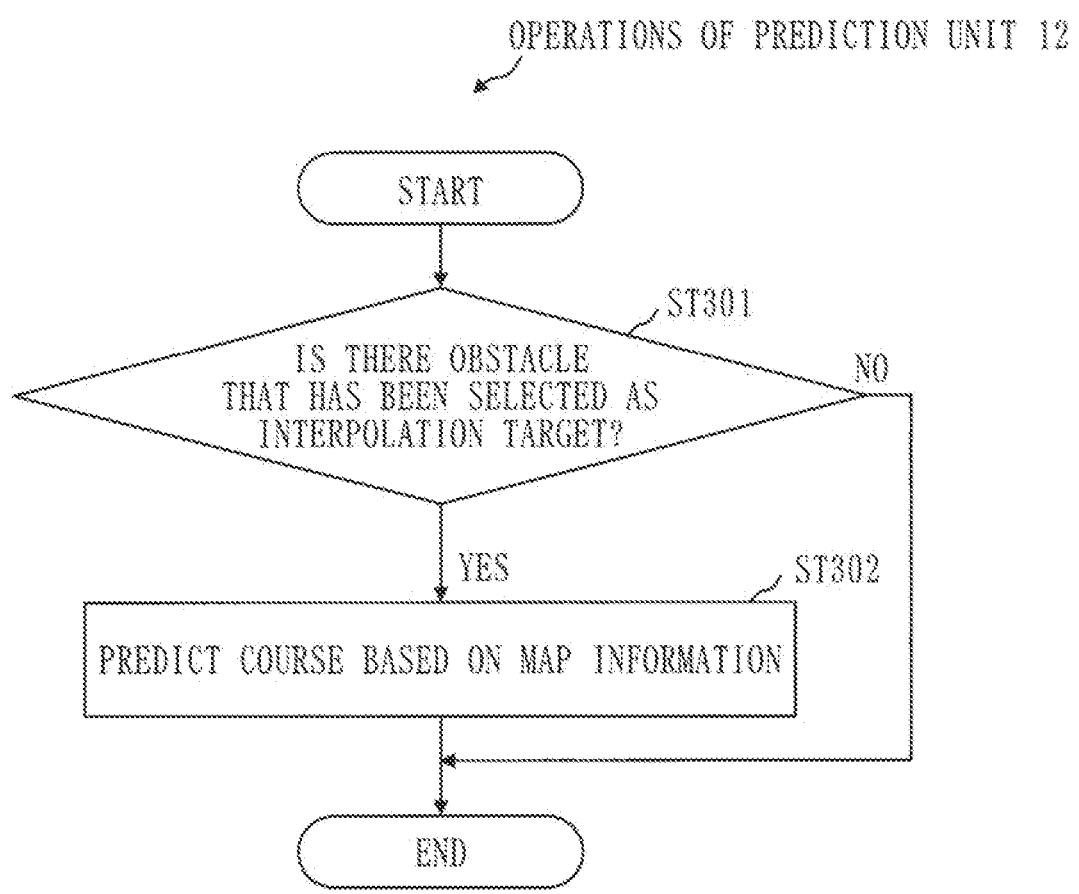
FIG. 18 is a diagram of Embodiment 2 which is a flowchart illustrating an operation algorithm of a prediction unit 12.

FIG. 18 illustrates an operation algorithm of a prediction unit 12 of Embodiment 2. Note that an operation algorithm of a blind spot calculation unit 11 is the same as that in FIG. 6 of Embodiment 1. Operations of the prediction unit 12 of Embodiment 2 will be described below with referring to FIG. 18.

The prediction unit 12 of Embodiment 2 acquires map information including a blind spot area and, using the map information, predicts a course in the blind spot area of an object whose entry to the blind spot area has been detected.
<Step ST301>
An operation of step ST301 is the same as that of step ST201, and accordingly its description will be omitted.
<Step ST302>
When a corresponding obstacle exists, then in step ST302, the prediction unit 12 acquires from the map storage device 6 map information of a lane the corresponding obstacle, being another vehicle, was traveling. The lane the corresponding obstacle, being another vehicle, was traveling is a lane decided from a position indicated by a sensing result 84 of another vehicle immediately before the sensing result 84 ceases. The prediction unit 12 assumes that another vehicle will continuously travel the lane on the acquired map information, and predicts the course of another vehicle in the blind spot area.

The map information sometimes stores information that one lane branches into two lanes. The map information also sometimes stores information of an intersection. In such a case, the prediction unit 12 must decide which course another vehicle will travel, and then use the position information of the map information. In this case, the prediction unit 12 decides the course in accordance with the following judgment rules (1) and (2).
(1) Another vehicle selects a road with a largest width and travels that road.
(2) When a plurality of roads have the same width, another vehicle selects a road the nearest to the system-mounted vehicle 71 and travels that road.

When the obstacle is not an automobile but a human being, similar course prediction can be performed. In the case of a human being, the prediction unit 12 uses information of a sidewalk and a pedestrian crossing on the map information, in addition to the lane information on the map information. Furthermore, for judgment rules that decide a course of a human being, the prediction unit 12 adds following judgment rule (3) to the above judgment rules (1) and (2).
(3) When there are a sidewalk and a pedestrian crossing, a human being selects the pedestrian crossing and walks on it.

In the above, it is assumed that, as the information stored in the map storage device 6, position information of a point expressing a lane center is stored for points at predetermined intervals. In addition to the position information of a point expressing a lane center which is stored for points at predetermined intervals, a coefficient used for expressing a shape of a line segment expressing a lane center by a polynomial expression may also be stored. As the information stored in the map storage device 6, information of a division line constituting the lane may be stored, instead of a line center.

The map information to be stored in the map storage device 6 is not limited to information that has already been created.

For example, map information which is created and recorded at any time by detecting a lane with a sensor 4a provided to a front portion of a system-mounted vehicle 71, may be stored in the map storage device 6.

Figure 19:
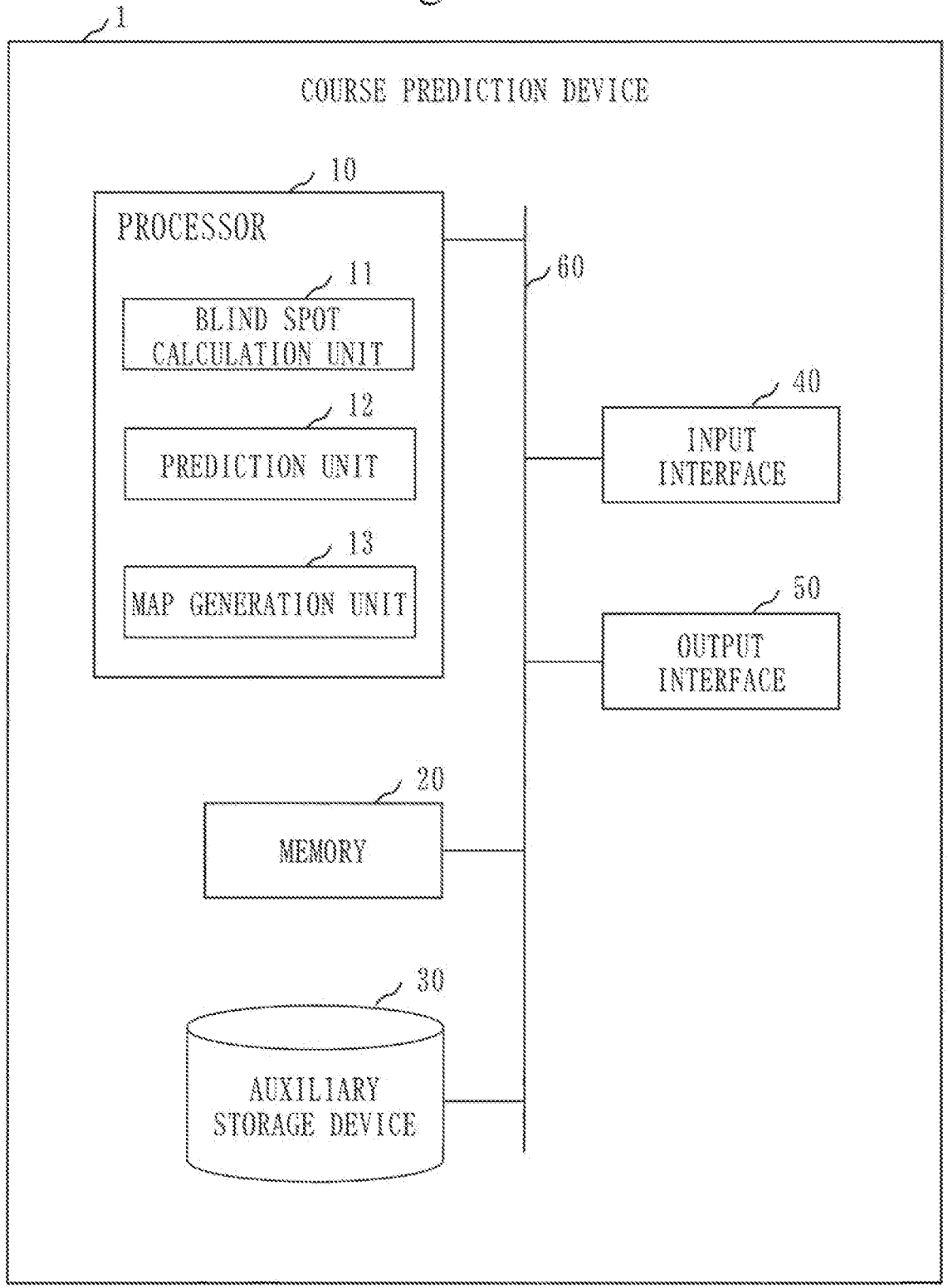
FIG. 19 is a diagram of Embodiment 2 illustrating a configuration in which a course prediction device 1 has a map generation unit 13.

FIG. 19 illustrates a configuration in which a course prediction device 1 has a map generation unit 13. The map generation unit 13 generates map information based on information of the lane detected by the sensor 4a provided to the front portion of the system-mounted vehicle 71, and stores the map information to a memory 20. The map generation unit 13 stores the map information stored in the memory 20 to an auxiliary storage device 30. The prediction unit 12 loads the map information generated by the map generation unit 13 to the memory 20 from the auxiliary storage device 30, and predicts a course in a blind spot area of an obstacle whose entry to the blind spot area has been detected, using the loaded map information.

Effect of Embodiment 2

In Embodiment 2, the course prediction device 1 performs course prediction of the obstacle in the blind spot area using the map information stored in the map storage device 6, and interpolates obstacle course data. The obstacle course data interpolated by the course prediction device 1 is inputted to a movement prediction device 2. Thus, even when the obstacle enters a blind spot, a sensing result of the obstacle is interpolated. Therefore, the movement prediction device 2 can continuously predict the movement of the obstacle. Embodiment 2 describes a case of an automobile. The same effect can be obtained when Embodiment 2 is applied to a vessel or a train which travels a track, as in Embodiment 1. In the case of a vessel, a navigation route chart may be used as the map. In the case of a train, a chart expressing a shape of a railroad track may be used.
<Modification>
In Embodiments 1 and 2, the functions of the course prediction device 1 are implemented by software. In a modification, the functions of the course prediction device 1 may be implemented by hardware.

Figure 20:
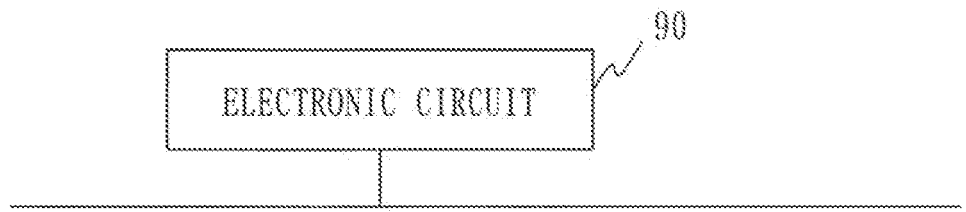
FIG. 20 is a diagram illustrating a course prediction device 1 according to a modification of Embodiment 1 and Embodiment 2.

FIG. 20 is a diagram illustrating a configuration of a course prediction device 1 according to a modification of Embodiment 1.

An electronic circuit 90 of FIG. 20 is a dedicated electronic circuit that implements the functions of the blind spot calculation unit 11, prediction unit 12, map generation unit 13, memory 20, auxiliary storage device 30, input interface 40, and output interface 50. The electronic circuit 90 is specifically a single circuit, a composite circuit, a programmed processor, a parallel-programmed processor, a logic IC, a GA, an ASIC, or an FPGA. Note that GA stands for Gate Array.

ASIC stands for Application Specific Integrated Circuit. FPGA stands for Field-Programmable Gate Array. The functions of the constituent elements of the course prediction device I may be implemented by one electronic circuit, or may be implemented by a plurality of electronic circuits through distribution. In another modification, some of the functions of the constituent elements of the course prediction device 1 may be implemented by an electronic circuit, and the remaining functions may be implemented by software.

The processor and the electronic circuit are each called processing circuitry. That is, in the course prediction device 1, the functions of the blind spot calculation unit 11, prediction unit 12, and map generation unit 13 are implemented by processing circuitry. Alternatively, the functions of the blind spot calculation unit 11, prediction unit 12, map generation unit 13, memory 20, auxiliary storage device 30, input interface 40, and output interface 50 may be implemented by processing circuitry.

Embodiments 1 and 2 are described above. Of these embodiments, two embodiments may be combined and practiced. Alternatively, of these embodiments, one embodiment may be practiced partly. Alternatively, of these embodiments, two embodiments or more may be combined partly and practiced. The present invention is not limited to these embodiments, and various modifications may be made as necessary.

REFERENCE SIGNS LIST

1: course prediction device; 2: movement prediction device; 3: display device; 4, 4a, 4b: sensor; 5: vehicle management device; 5a: control unit; 6: map storage device; 7: in-vehicle network; 8: in-vehicle system; 10, 10a: processor; 11: blind spot calculation unit; 12: prediction unit; 13: map generation unit; 20, 20a: memory; 30, 30a: auxiliary storage device; 40, 40a: input interface; 50, 50a: output interface; 60, 60a: signal line; 61: first blind spot area; 62: second blind spot area; 64: predicted course; 65: blind spot area; 66: obstacle; 67: pre-passage course; 68: post-passage course; 70: traveling trace; 71: system-mounted vehicle; 71a: traveling trace; 71b: predicted travel course; 72, 73: vehicle; 72a: reflection point; 81: road; 82: advancing direction; 83a, 83b: sensing range; 84: sensing result; 85: slope; 86: curved road; 90: electronic circuit.

The invention claimed is:

1. A course prediction device comprising:
processing circuitry configured to:
acquire sensor information sequentially from a sensor which is provided in a vehicle and which detects whether an object exists, calculate, based on the sensor information, a blind spot area where the object existing therein cannot be detected by the sensor, and detect the object entering the blind spot area based on the sensor information,
when the object is located ahead of the vehicle, predict a travel course of the object within the blind spot area by performing interpolation based on a steering wheel angle of the vehicle;
when the object is located behind the vehicle, predict the travel course of the object within the blind spot area by performing interpolation based on a previous travel trajectory of the vehicle; and
control the vehicle to steer clear of the predicted travel course of the object in the blind spot area.

2. The course prediction device according to claim 1, wherein the processing circuitry acquires shape decisive information expressing information that can decide a shape of a moving course of the vehicle and, using the shape decisive information, predicts the travel course of the object within the blind spot area.

3. The course prediction device according to claim 2, wherein the processing circuitry acquires the previous travel trajectory of the vehicle as the shape decisive information.

4. The course prediction device according to claim 2, wherein the processing circuitry acquires steering information on how the vehicle is being steered, as the shape decisive information.

5. The course prediction device according to claim 1, wherein the processing circuitry acquires map information including the blind spot area and, using the map information, predicts the travel course of the object within the blind spot area.

6. The course prediction device according to claim 5, wherein the processing circuitry
generates the map information, and
acquires the generated map information.

7. A non-transitory computer readable medium recorded with a course prediction program which causes a computer to execute a course prediction method comprising:
acquiring sensor information sequentially from a sensor which is provided in a vehicle and which detects whether an object exists, calculating, based on the sensor information, a blind spot area where the object existing therein cannot be detected by the sensor, and detecting the object entering the blind spot area based on the sensor information;
when the object is located ahead of the vehicle, predicting a travel course of the object within the blind spot area by performing interpolation based on a steering wheel angle of the vehicle;
when the object is located behind the vehicle, predicting the travel course of the object within the blind spot area by performing interpolation based on a previous travel trajectory of the vehicle; and
controlling the vehicle to steer clear of the predicted travel course of the object in the blind spot area.

8. A course prediction method comprising:
acquiring sensor information sequentially from a sensor which is provided in a vehicle and which detects whether an object exists, calculating, based on the sensor information, a blind spot area where the object existing therein cannot be detected by the sensor, and detecting the object entering the blind spot area based on the sensor information;
when the object is located ahead of the vehicle, predicting a travel course of the object within the blind spot area by performing interpolation based on a steering wheel angle of the vehicle;
when the object is located behind the vehicle, predicting the travel course of the object within the blind spot area by performing interpolation based on a previous travel trajectory of the vehicle; and
controlling the vehicle to steer clear of the predicted travel course of the object in the blind spot area.

* * * * *